United States Patent
Sakamoto et al.

[11] Patent Number: 5,164,439
[45] Date of Patent: Nov. 17, 1992

[54] POLYESTER FILM FOR MAGNETIC RECORDING MEDIA

[75] Inventors: Seiji Sakamoto, Machida; Kazuo Endo, Yokohama; Yoshio Meguro, Machida, all of Japan

[73] Assignee: Diafoil Company, Ltd., Tokyo, Japan

[21] Appl. No.: 710,438

[22] Filed: Jun. 5, 1991

[30] Foreign Application Priority Data

Jun. 7, 1990 [JP] Japan ................. 1-148938
Jun. 7, 1990 [JP] Japan ................. 1-148939
Jun. 7, 1990 [JP] Japan ................. 1-148940
Jun. 29, 1990 [JP] Japan ................. 1-172188

[51] Int. Cl.$^5$ ............ C08J 3/20; C08K 3/26; C08L 31/08
[52] U.S. Cl. ................... 524/425; 524/430
[58] Field of Search .................. 524/425, 430

[56] References Cited

U.S. PATENT DOCUMENTS

| | | | |
|---|---|---|---|
| 4,568,616 | 2/1986 | Seifried et al. | 428/480 |
| 4,720,412 | 1/1988 | Katoh et al. | 428/480 |
| 4,727,108 | 2/1988 | Kagiyama et al. | 524/425 |
| 5,006,589 | 4/1991 | Sakamoto et al. | 524/430 |

FOREIGN PATENT DOCUMENTS

| | | |
|---|---|---|
| 0152265 | 8/1985 | European Pat. Off. |
| 0236945 | 3/1987 | |
| 0296610 | 12/1988 | European Pat. Off. |
| 59-5216 | 1/1984 | Japan |
| 59-69425 | 4/1984 | Japan |
| 59-69426 | 4/1984 | Japan |
| 63-137927 | 6/1988 | Japan |
| 1256558 | 10/1989 | Japan |

Primary Examiner—Paul R. Michl
Assistant Examiner—V. K. Rajguru
Attorney, Agent, or Firm—David G. Conlin; Robert M. Asher

[57] ABSTRACT

A biaxially oriented polyester film containing a specific calcium carbonate is described. The calcium carbonate contained in the film is specified by its vaterite form, its average particles size of 0.07 to 1.5 μm, and its particle size distribution ratio of not more than 2.00. The biaxially oriented polyester film containing such specific calcium carbonate is excellent in both the running property and wear resistance, and suitable for the use as a base of magnetic recording media.

14 Claims, 1 Drawing Sheet

POLYESTER FILM FOR MAGNETIC RECORDING MEDIA

BACKGROUND OF THE INVENTION

The present invention relates to a base film for magnetic recording media which has excellent mechanical properties, surface property, running property, wear resistance and flatness.

Polyester films have excellent physical and chemical properties and are widely used in industrial fields. Above all, biaxially oriented polyethylene terephthalate films, which superior in the flatness, mechanical strength, dimension stability, etc., are now essential as a base material for magnetic recording media.

Magnetic recording media have recently been rapidly improved and with this improvement, base film is also strictly required to have improved properties.

For example, in media such as a video tape which is required to record data at high density, the base film is required to have a flatter surface. If the film does not have a flat surface, however, not only is the running property deteriorated but also the friction and wear between the film and the base material such as pin, etc. are increased, which causes various troubles such as damage of the film and production of abrasion dust. The abrasion dust causes a missing in a recording signal, namely, dropout, thereby greatly deteriorating the commercial value of the film.

It is generally known that if the surface of the film is made coarse to a certain extent, running property and the wear resistance are improved. For this purpose, a method of adding fine particles to a material polyester is adopted and partially put to practical use, but the quality of the thus-produced polyester film cannot be said to be satisfactory in these properties.

For example, when so-called deposited particles formed from a residual catalyst for producing a polyester is used, since the deposited particles are easily broken during the stretching process, the running property and the wear resistance of the film are inferior and, in addition, the film is difficult to reuse.

On the other hand, when inorganic particles such as kaolin, silicon oxide, titanium dioxide and calcium phosphate which are inert to polyesters are added to a polyester, since the particles are not broken or deformed during the stretching process and these particles provide comparatively steep protuberances, the running property is improved. However, since the particle size distribution is generally broad, the coarse protuberances frequently cause the deterioration of the electromagnetic transducing nature and dropouts.

In order to cope with this antinomy, use of inorganic or organic particles having a sharp particle size distribution has recently been proposed. For example, Japanese Patent Application Laid-Open (KOKAI) Nos. 62-207356 (1987) (EP 236945) and 59-217755 (1984) (U.S. Pat. No. 4,568,616) propose the use of monodisperse silicon oxide and the use of cross-linked organic particles obtained by emulsion polymerization, respectively. Both methods, however, have problems. In the former case, since the hardness is so high as to be apt to damage the base material which the film comes into contact with and in the latter case, the particles are easy to deform during the stretching process and inferior in the heat resistance.

As described above, in the present state of art, there in no polyester film for magnetic recording media which sufficiently satisfies the running property and the wear resistance and which also has other necessary properties.

SUMMARY OF THE INVENTION

Accordingly, it is an object of the present invention to eliminate the above-described problems in the prior art and to provide a polyester film for recording media which sufficiently satisfies the running property and the wear resistance and which also has other necessary properties.

To achieve this aim, the present invention provides a biaxially oriented polyester film containing 0.005 to 2.0 wt % of vaterite calcium carbonate particles which have an average particle diameter of 0.07 to 1.5 μm and a particle size distribution ratio defined by the following formula of not more than 2.00:

$$\text{particle size distribution ratio} = \frac{d_{25}}{d_{75}}$$

wherein $d_{25}$ is the particle size (μm) of the vaterite calcium carbonate particle when the cumulative volume thereof is 25% of the total volume of said particles and $d_{75}$ is the particle size (μm) of the vaterite calcium carbonate particle when the cumulative volume thereof is 75% of the total volume of said particles, said cumulative volumes being calculated beginning with the largest particle size.

BRIEF EXPLANATION OF THE DRAWINGS

In FIG. 1, 1 is a SUS-420-J2 fixed pin of 6 mm diameter, 2 is an inlet tension meter, 3 is an outlet tension meter and θ (contact angle) is 135°.

In FIG. 2, 4 is a SUS-420-J2 fixed pin of 6 mm diameter, 5 is a tension meter and θ (contact angle) is 135°.

DETAILED DESCRIPTION OF THE INVENTION

Figure 1:
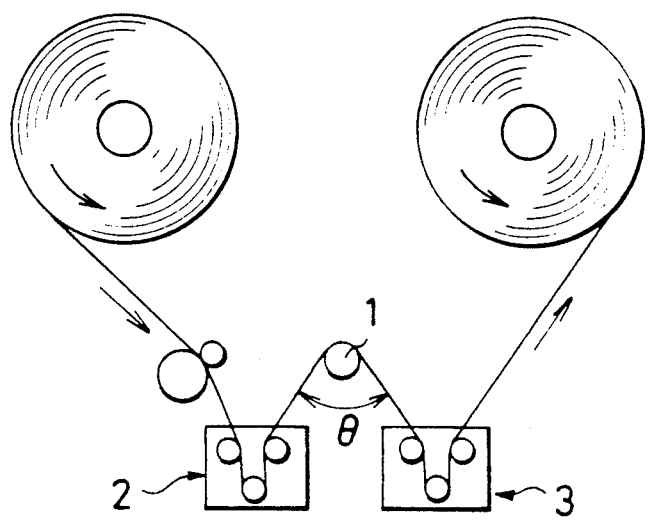
FIG. 1 illustrates a tape running system for evaluating the running property of a film.

The "polyester" in the present invention means a polyester in which the constitutional repeating units are mainly ethylene terephthalate units or ethylene-2,6-naphthalate units, preferably means a polyester in which 80 mol % or more of the constitutional repeating units of the polyester are ethylene terephthalate units or ethylene-2, 6-naphthalate units. Other constitutional components which may be contained in the polyester chain may include one or more of a dicarboxylic acid component derived from isophthalic acid, phthalic acid, adipic acid, sebacic acid, etc.; a hydroxycarboxylic acid component derived from p-hydroxyethoxybenzoic acid, etc.; and a glycol component derived from propylene glycol, butane diol, 1,4-cyclohexane dimethanol, neopentyl glycol, etc. The intrinsic viscosity of the polyester is usually 0.50 to 0.90, preferably 0.55 to 0.75. The "polyester film" in the present invention means a biaxially oriented film with such a polyester as a starting material and produced by a known method. For example, the polyester film is produced by forming a polyester into a sheet by melt extrusion ordinarily at 270° to 320° C., cooling the sheet to 40° to 100° C. into an amorphous sheet, stretching the amorphous sheet in the machine and transverse directions subsequently or simultaneously by 4 to 20 times by areal stretch ratio at 80° to 140° C., and heat treating the stretched sheet at 160° to 250° C. It is possible to stretch or heat treat the sheet in multiple stages or restretch it, if necessary.

One of the characteristics of the present invention is that monodisperse vaterite calcium carbonate particles are used as particles added to a polyester film.

As a method of producing calcium carbonate particles, in addition to a method in which natural calcium carbonate is pulverized and classified, a method of synthesizing precipitated calcium carbonate particles by introducing carbon dioxide-containing gas into a calcium hydroxide solution is conventionally known, as disclosed in, for example, Japanese Patent Application Laid-Open (KOKAI) No. 59-69425 (1984). In this case, calcite calcium carbonate particles having a comparatively uniform particle size are obtained, and a method of producing a polyester film by adding these calcite calcium carbonate particles to a polyester is known, as described in, for example, Japanese Patent Publication (KOKOKU) No. 1-16856 (1989) (U.S. Pat. No. 4,727,108). However, since the particle size distribution of these particles does not reach the desired particle size distribution yet, it is impossible to obtain a film having good properties.

Vaterite calcium carbonate particles having a sharp particle size distribution used in the present invention can be produced by adopting carbonation reaction by blowing carbon dioxide into an alcohol medium such as methanol in such a synthetic process and appropriately selecting the reaction conditions such as hydrogen ion concentration, reaction rate and reaction temperature. Vaterite calcium carbonate particles thus produced are commercially available. Vaterite calcium carbonate particles can be added as they are during the process for producing a polyester, but they are preferably subjected to surface treatment in advance in order to reduce the solubility to the reaction system and to improve the dispersibility. As the surface treating agent which also serves as a dispersant, a surface treating agent such as those described in Japanese Patent Application Laid-Open (KOKAI) Nos. 59-69426 (1984) and 1-256558 (1989), in particular, high-molecular polycarboxylic acid and sodium salts and ammonium salts thereof are preferably used. Adding these surface treating agents during the process of producing the vaterite calcium carbonate particles is generally effective.

These vaterite calcium carbonate particles are generally obtained in the form of a sphere or an ellipsoid, and the ratio of the major axis and the minor axis is generally less than about 1.8. The particle size distribution ratio of these calcium particles as defined above in the present invention is not more than 2.00, preferably not more than 1.60, more preferably not more than 1.50. If the ratio exceeds 2.00, the surface roughness of the film finally obtained becomes nonuniform, which impairs the electromagnetic characteristics.

The average particle size of the vaterite calcium carbonate particles is 0.07 to 1.5 μm, preferably 0.15 to 1.0 μm. If the average particle size is less than 0.07 μm, the running property and the wear resistance are scarcely improved. On the other hand, if it exceeds 1.5 μm, although the roughness is uniform, the absolute value thereof is so large as to deteriorate the electromagnetic characteristics.

The amount of particles added to the film is in the range of 0.005 to 2.0 wt %, preferably 0.01 to 0.8 wt %. If the amount of particles mixed is less than 0.005 wt %, the running property and the wear resistance are not improved while if the amount exceeds 2.0%, the electromagnetic characteristics are deteriorated.

Vaterite calcium carbonate particles in the form of circular cylinder or elliptic cylinder are also commercially available. If the particle size, the particle size distribution ratio and the amount of particles added to a film are in the above-described ranges, those particles are preferably used in the present invention.

In this case, the particles in which the height of cylinder is 0.1 to 1.0 time, preferably, 0.2 to 0.6 time of the average value of the major axis and the minor axis of the base (average base diameter) are suitable in the present invention. If each particle has such a shape, the particles are arranged approximately in parallel to each other on the surface of a biaxially oriented film and the particles are unlikely to drop off by friction.

If the ratio of the height of the cylinder and the average base diameter is less than 0.1, the particles are easily damaged during the processing of the particles or production of a film, and the surface protuberances become too small. On the other hand, if the ratio exceeds 1.0, the particle shape approaches a block, so that the particles comparatively easily drop off the film surface.

Even if the central portion of a cylindrical particle is slightly thick or the base is slightly different from an exact ellipse, if the particle has a nearly circular cylindrical or elliptic cylindrical shape, the effects of the present invention can be obtained.

The particles may be not porous, but if they are porous, they are superior in the affinity with a polyester.

As described above, vaterite calcium carbonate particles having a specific shape and a specific particle size distribution are used in the present invention. More excellent effects are obtained especially when use of the particles is combined with some of the following conditions.

Firstly, in the case of a polyester film containing ethylene terephthalate units as the main constitutional repeating units, the slipperiness and wear resistance are improved by making the refractive index in the thicknesswise direction of the film containing the vaterite calcium carbonate particles not less than 1.492. This value is preferably 1.494 to 1.505. A film having a refractive index in the above range is obtained, for example, in the case of sequential biaxial stretching (machine direction-transverse direction), by carrying out the stretching in the machine direction at a temperature about 105° to 115° C., which is 5° to 30° C. higher than the ordinary stretching temperature. Alternatively, the sheet may be relaxed in the transverse direction to a great extent before the heat treatment after the biaxial stretching.

In addition, if the refractive index of the film in the thickness direction is not less than 1.492, the adhesiveness of the film with a magnetic layer is also improved.

Secondly, in the case of a film containing ethylene terephthalate units as the main constitutional repeating units, if the sum of the Young's modulus of the film in the machine direction and the Young's modulus of the film in the transverse direction is not less than 900 kg/mm$^2$, preferably not less than 1,000 kg/mm$^2$, more preferably not less than 1,100 kg/mm$^2$, excellent effects are obtained. In this case, the difference between the Young's modulus in the machine direction and the Young's modulus in the transverse direction is preferred to be not less than 100 kg/mm$^2$, more preferably not less than 150 kg/mm$^2$, further preferably 200 kg/mm$^2$.

When the film is stretched to a great extent so as to have such a high strength, particles are generally apt to drop off the surface layer and the wear resistance is reduced, but in the present invention, the particles which drop off are rather reduced.

A film having such a high strength is produced by a known method. For example, after polyester chips are melt extruded at 270° to 300° C. into the form of a film, the film is cooled and solidified at 40° to 70° C. to obtain an amorphous sheet. The sheet is stretched in the machine direction to 3.0 to 6.0 times at 80° to 120° C. and then in the transverse direction to 3.0 to 6.0 times at 80° to 120° C., and the stretched sheet is heat-treated at 170° to 240° C. A method of producing a film by simultaneously or sequentially biaxially stretching the film in the machine and transverse directions, restretching the film in the machine direction at 110° to 180° C. by 1.05 to 2.0 times and heat-treating the film may be adopted. In this case, techniques of heat-setting the film before restretching the film in the machine direction, relaxing the film in the machine direction after restretching the film in the machine direction, stretching the film to a minute time before or after restretching the film in the machine direction and the like can be adopted appropriately. Restretching in the transverse direction is also applicable.

Thirdly, in the case of a film mainly containing polyethylene terephthalate units as the main constitutional repeating units, if the melt resistivity of the polyester is $6 \times 10^6$ to $5 \times 10^8$ $\Omega$-cm, preferably $8 \times 10^6$ to $1 \times 10^8$ $\Omega$-cm, the sheet produced by an electrostatic cooling method has a greatly improved flatness.

In order to adjust the resistivity of melting polyester to the above range, the following method is adopted.

In order to reduce the resistivity, a metal component is solubilized in the polyester preferably by adding a comparatively small amount of, for example, not more than the equivalent amount of a phosphorus compound with respect to the metal element which is used as a catalyst for an ester interchange reaction or the metal element which is added after an ester interchange reaction or esterification reaction, if necessary.

On the other hand, in order to increase the resistivity, the amount of metal compound in the polyester is reduced.

In the present invention, both ester interchange reaction method and esterification reaction method are usable, but the former method is preferable. For example, magnesium, manganese, calcium or the like is used as a catalyst to enhance the polymerization degree of a polyester which contains the vaterite calcium carbonate particles in the presence of about 0.3 to 1.0 equivalent of a phosphorus compound.

Fourthly, in a film mainly containing polyethylene terephthalate units as the main constitutional repeating units, if the average refractive index ($\overline{n}$) is 1.598 to 1.605, excellent effects are produced. If $\overline{n}$ is less than 1.598, the dimensional stability is lowered when a slight heat is applied to the film, which may lead to the lowering of the skew property after the film is formed into a magnetic tape. On the other hand, if $\overline{n}$ exceeds 1.605, the film surface becomes so fragile as to easily produce white abrasion dust. The preferred $\overline{n}$ value is in the range of 1.600 to 1.603.

Fifthly, the present invention produces excellent effects when the vaterite calcium carbonate particles are added to a polyethylene-2,6-naphthalate film. Among polyester films, a polyethylene-2,6-naphthalate film which contains ethylene-2,6-naphthalate units as the main constitutional repeating units is especially excellent in the mechanical strength and the heat resistance, so that it attracts attention and it is in course of being put to practical use. However, since this film is often used under more strict conditions in respect of running speed and tension than other films, the improvement of wear resistance has been demanded.

In the film which is stretched to such a degree that the sum of the Young's modulus in the machine direction and the Young's modulus in the transverse direction is not less than 1,300 kg/mm$^2$, preferably not less than 1,400 kg/mm$^2$, more preferably not less than 1,500 kg/mm$^2$, the base surface of the vaterite calcium carbonate particles become parallel to the surface of the film, thereby improving the wear resistance. In addition, the sum of the F-5 values in the machine direction and the transverse direction of a polyethylene-2,6-naphthalate film is preferably not less than 25 kg/mm$^2$, more preferably not less than 30 kg/mm$^2$, particularly preferably not less than 35 kg/mm$^2$. It is preferred to use a polyester having a melt resistivity of $1 \times 10^7$ to $5 \times 10^8$ $\Omega$-cm, more preferably $1 \times 10^7$ to $1 \times 10^8$ $\Omega$-cm, for obtaining such film. If these conditions are satisfied, the polyethylene-2,6-naphthalate film is excellent in the dimensional stability against an external force, so that the film is suitable for a magnetic recording medium which is especially required to have accurateness. In the present invention, it is preferred that the sum of the F-5 values in the machine direction and the transverse direction is in the above-described range and that the F-5 value in the machine direction is not less than 13 kg/mm$^2$ and the F-5 value in the transverse direction is not less than 12 kg/mm$^2$.

In the present invention, it is possible to further add at least one other kind of particles so as to further improve the running property, the winding property, the scuff resistance, etc. of the film.

As one example of such particles, deposited particles will be cited. The deposited particles here means, for example, particles which are formed in a reaction system from an alkali metal or alkaline earth metal as a catalyst for ester interchange reaction during polycondensation. Alternately, these particles may be formed by adding terephthalic acid during ester interchange reaction or polycondensation. In such a case, at least one phosphorus compound selected from the group consisting of phosphoric acid, trimethyl phosphate, triethyl phosphate, tributyl phosphate, acidic ethyl phosphate, phosphorous acid, trimethyl phosphite, triethyl phosphite and tributyl phosphite may be present.

These deposited particles can also be formed in the case of employing an esterification process, for example, by a method where an alkali metal or an alkaline earth metal compound is added before or after the end of the esterification reaction and a polymerization reaction is carried out in the presence or absence of a phosphorus compound.

In any case, the fine deposited particles which is produced during the polyester producing reaction contains at least one element such as calcium, lithium, antimony and phosphorus.

What is called additive particles may be used as one of the particles used together with the vaterite calcium carbonate particles. The additive particles here means particles externally added during the process of producing a polyester. For example, they are kaoline, talc, carbon, molybdenum sulfite, gypsum, rock salt, aluminum oxide, barium sulfate, lithium fluoride, calcium fluoride, ziolite, calcium phosphate, silicon dioxide and titanium dioxide.

The fine powder of heat-resistant polymer may be used as such additive particles. As a typical example thereof, a copolymer of a monovinyl compound having a single aliphatic unsaturated bond in its molecule and a compound having not less than two aliphatic unsaturated bonds in its molecule as a cross-linking agent, as is described in, for example, Japanese Patent Publication (KOKOKU) No. 59-5216 (1984) can be cited, but the heat-resistant polymer is not restricted thereto. For example, the fine powder of a thermosetting phenol resin, thermosetting epoxy resin, thermosetting urea resin, benzoguanamine resin and fluorine resin such as polytetrafluoroethylene is usable.

Natural calcium carbonate particles and synthesized calcite calcium carbonate particles can be also cited as examples of the particles which can be combinedly used with the vaterite calcium carbonate particles.

In the present invention, more than two kinds of vaterite particles having different average particle size may be used.

The particles used together with the vaterite calcium carbonate particles, i.e. the deposited particles and additive particles, can be used in the same amount or less, preferably 0.005 to 0.5 time, more preferably 0.01 to 0.3 time the amount of the vaterite calcium carbonate particles when the average particle size thereof is larger than the vaterite calcium carbonate particles. If the average particle size of the particles used together with the vaterite calcium carbonate particles is smaller than the latter, the particles may be used in the same amount or above, preferably 1 to 20 times the amount of the vaterite calcium carbonate particles.

A base film for magnetic recording media has recently been required to have a scuff resistance in addition to the flatness, slipperiness, wear resistance and the adhesiveness. This is because a tape is scuffed by the portion with which the tape comes into contact or by the abrasion dust produced when the tape is running at a high speed. Many scuffs not only impairs the appearance but also causes contamination during the manufacturing process and increases dropouts.

In order to improve the scuff resistance, aluminum oxide particles are preferably selected as the combinedly used particles. In particular, delta or gamma aluminum oxide particles having an average particle size of not more than 0.5 μm, preferably not more than 0.1 μm are preferably used. Delta aluminum oxide particles are more preferred. These particles are produced by, for example, a thermal decomposition method, that is, a method of flame hydrolyzing anhydrous aluminum chloride, or an ammonium alum thermal decomposition method, that is, a method of reacting aluminum hydroxide as the starting material with sulfuric acid, reacting the resultant aluminum sulfate with ammonium sulfate, and calcining the resultant ammonium alum.

The primary particle size of aluminum oxide obtained by these methods is generally in the range of 5 to 40 nm, but since they often form an agglomerate having a size of more than 0.5 μm, they are preferably used after appropriate pulverization. In this case, a few agglomerate of secondary particle may be contained, but the apparent average particle size is generally not more than 0.5 μm, preferably not more than 0.1 μm.

In this way, by adding vaterite calcium carbonate particles having a specific shape and other particles including fine aluminum oxide particles, if necessary, it is possible to produce a polyester film which is very excellent and especially suitable for magnetic recording media.

In producing a polyester containing the vaterite calcium carbonate particles, the vaterite calcium carbonate particles and the additive particles when used are preferably added during the production of the polyester. Especially, they are preferably added after the end of the ester interchange reaction or the esterification reaction and before the initiation of the polycondensation reaction.

The vaterite calcium carbonate particles and the additive particles when used are generally added in the form of a slurry of ethylene glycol, and they may be subjected to treatment such as pulverization, dispersion, classification and filtration in advance, if necessary.

The concentration of the particles in the ethylene glycol slurry is 3 to 50 wt %, preferably 10 to 40 wt %. If the concentration of the particles is less than 3 wt %, the amount of ethylene glycol used is increased and the unit of ethylene glycol is unfavorably increased. On the other hand, if the ethylene glycol slurry containing more than 50 wt % of particles is used, the dispersibility of the particles are often lowered.

As the catalyst for polycondensation reaction for the synthesis of a polyester, for example, Sb, Ge, Ti, Sn and Si compounds which are generally used as a catalyst are usable.

A film of the present invention suitable for magnetic recording media is obtained by a combination of specific particles and specific film properties. The surface roughness of the film is appropriately controlled so that the center line average roughness thereof is generally 0.005 to 0.1 μm, preferably 0.007 to 0.08 μm, more preferably 0.01 to 0.03 μm.

The film of the present invention has a thickness of 1 to 250 μm, preferably 1.5 to 80 μm, and is not only useful as a base film for video tapes but also effective as a base film for audio tapes.

The film of the present invention is further usable for other purposes such as a dielectric of a capacitor, packaging, decoration and plate for various purposes.

The present invention will be explained in more detail while referring to the following non-limitative examples.

The physical properties were measured in the following methods.

"Part" and "%" in the following examples mean "part by weight" and "wt %", respectively.

(1) Average particle size and particle size distribution ratio

The particle size was measured by a photographic method using an electron microscope and calculated as the diameter of an equivalent sphere. For obtaining the particle size distribution ratio, the particle sizes of about 1,000 particles were measured and the volumes thereof were cumulated beginning with the largest particle size. On the assumption that the particle size of the particle when the cumulative volume is 25% of the total volume was $d_{25}$ and the particle size when 75% was $D_{75}$, the sharpness of the particle size distribution ratio was expressed by the ratio of $d_{25}$ to $d_{75}$ ($d_{25}/d_{75}$). The closer the value is to 1, the sharper is the particle size distribution. The average particle size was represented by $d_{50}$ (μm).

(2) Melt resistivity of polyester

The melt resistivity of polyester was measured by the method described in "British Journal of Applied Physics", vol. 17, pp. 1149 to 1154 (1966). The melting temperature for the polymer was 295° C. and the value obtained immediately after the application of a direct current of 1,000 V was regarded as the resistivity of the molten polyester.

(3) Refractive index in the direction of film thickness and average refractive index The each refractive index was measured at 23° C. by an Abbe refractometer using the sodium D-line. The average refractive index $\bar{n}$ was obtained from the following formula:

$$\bar{n} = \tfrac{1}{3}(n\alpha + n\beta + n\gamma)$$

wherein $n\alpha$ represents the refractive index in the direction of film thickness, $n\gamma$ the refractive index in the direction of the main orientation of the film and $n\beta$ the refractive index in the direction orthogonal to the direction of the main orientation.

(4) Slipperiness of film

The film was brought into contact with a fixed metal roll (6 mm diameter) plated with hard chromium at a contact angle ($\theta$) of 135° by the apparatus shown in FIG. 1. While a load of 53 g ($T_2$) was applied to one end of the film it was caused to running at the speed of 1 m/min, and the resisting force $T_1$ (g) of the other end was measured. The coefficient of dynamic friction during the running was obtained from the following formula:

$$\mu d = \frac{180}{\pi\theta} \ln\left(\frac{T_1}{T_2}\right) = 0.424 \ln\left(\frac{T_1}{53}\right).$$

(5) F-5 Value

F-5 value was expressed by the value represented by the stress (kg/mm$^2$) at 5% elongation of the film measured by an Instron tensile tester.

Five samples of 150 mm long and 6.25 mm width were cut out of a biaxially oriented film and subjected to tensile test at a pulling speed of 50 mm/min with chucks interval and gauge marks interval of 50 mm.

The load applied to the film at the time of 5% elongation of the film was read from the S-S curve obtained and the F-5 values was calculated from the following formula. The five F-5 values obtained were averaged.

$$F\text{-}5 = \frac{\text{Load (kg) at 5\% elongation}}{\text{Sectional area (mm}^2\text{) of sample}}$$

(6) Young's modulus

Young's modulus was measured at 23° C. and 50% RH by Intesco Model 2001 produced by Intesco. A sample film 300 mm long and 20 mm wide was pulled at a strain speed of 10%/min, and Young's modulus was calculated from the following formula by using the initial straight line portion of the tensile stress-strain curve:

$$E = \Delta\sigma/\Delta\epsilon$$

E=Young's modulus (kg/mm)
$\Delta\sigma$=difference in stress between two points on the straight line based on the original average sectional area
$\Delta\epsilon$=difference in strain between the two points.

(7) Surface roughness

Center line average roughness (Ra)

The center line average roughness was measured in the following way by a surface roughness meter (SE - 3F) produced by Kosaka Kenkyusho Co., Ltd. From the surface roughness curve of the film, a portion of a reference length of L (2.5 mm) was sampled in the direction of the center line. Assuming the center line of the sampled portion as the axis X, and the direction vertical to the center line as the axis Y, the roughness curve was expressed as Y=f(x). The value obtained from the following formula was presented as Ra ($\mu$m).

$$Ra = \frac{1}{L} \int_0^L |f(x)|\, dx.$$

From the surface of the sample film, 10 surface roughness curves were obtained and the average value of Ra for these curves was expressed as the center line average roughness. The radius of the end of the feeler was 2 $\mu$m, the load was 30 mg and the cut-off value was 0.08 mm.

Maximum height (Rt)

From the surface roughness curve of the film obtained by a surface roughness meter (SE - 3F) produced by Kosaka Kenkyusho Co., Ltd., a portion of a reference length of L (2.5 mm) was sampled (the portion will be referred to as "sampled portion" hereinunder). The sampled portion was sandwiched between two straight lines which are parallel to the average line of the sampled portion, and the distance ($\mu$m) between the two straight lines was expressed as the maximum height of the sampled portion. From the surface of the sample film, 10 surface roughness curves were obtained and the average value of the maximum heights of the sampled portion was expressed as the maximum height of the film surface. The radius of the end of the feeler was 2.0 $\mu$m, the load was 30 mg and the cut-off value was 0.08 mm. The smaller Rt/Ra is, the more uniform is the surface roughness of the film.

(6) Wear characteristics

Wear characteristics were evaluated by the following two methods.

(A) Number of depressions on the film surface

Gold was deposited on the surface of the film. The film was photographed by a scanning electron microscope at 2,000 magnifications. The number of the depressions formed by drop-off of the tips of protuberances was measured per 1 mm$^2$ of the film surface. The smaller the value, the better.

(B) Amount of white abrasion dust

Figure 2:
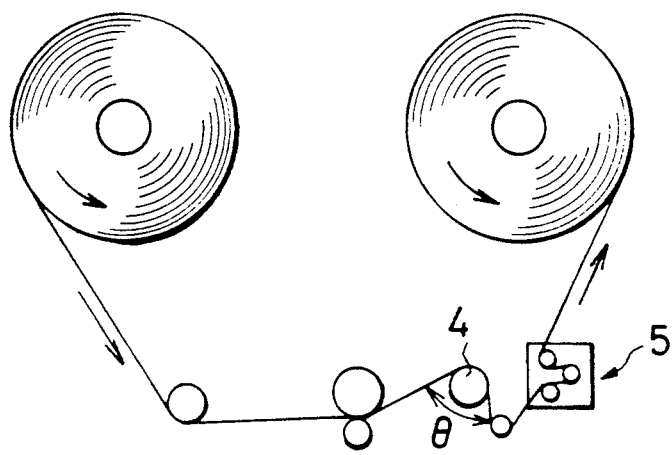
FIG. 2 illustrates a tape running system for evaluating wear resistance.

Amount of white abrasion dust was measured by the apparatus shown in FIG. 2.

The film was brought into contact with a fixed pin (6 mm in diameter) plated with hard chromium at a contact angle of 135° and caused to travel at a speed of 10 m/min and a tension of 200 g over a length of 1,000 m. The white abrasion dust which had adhered to the pin was visually judged in accordance with the following criteria.

| Rank A: | No adhesion |
| Rank B: | Slight adhesion |
| Rank C: | Small amount of adhesion (larger amount than in Rank B) |
| Rank D: | A large amount of adhesion |

(9) Magnetic tape characteristics

A magnetic layer was first formed by applying the following magnetic coating on the polyester film so that the dry thickness of the magnetic layer was 2 μm.

More precisely, 200 parts of a magnetic fine powder, 30 parts of polyurethane resin, 10 parts of nitrocellulose, 10 parts of a vinyl chloride-vinyl acetate copolymer, 5 parts of lecithin, 100 parts of cyclohexanone, 100 parts of methyl isobutyl ketone and 300 parts of methyl ethyl ketone were mixed and dispersed for 48 hours in a ball mill. Thereafter, 5 parts of a polyisocianate compound was added thereto to produce a magnetic coating. After the magnetic coating was applied to a polyester film, the film was magnetically oriented before the coating was sufficiently dried and solidified. Thereafter, the film was dried. After the thus-coated film was subjected to surface treatment by a supercalender, it was slit to a width of ½ inch to obtain a video tape. The magnetic film obtained was mounted on a video deck Model NV-3700 produced by Matsushita Electric Industrial Co., Ltd. and caused to run at an ordinary speed to evaluate the following magnetic tape characteristics.

Output of VTR head

The output of the VTR head at a measuring frequency of 4 MHz was measured by a synchroscope and the relative value to that of a reference sample was expressed by decibel (dB).

Number of dropouts

A video tape which had recorded signals of 4.4 MHz was reproduced and the number of dropouts at 15 μsec-20 dB was counted for about 20 minutes by a dropout counter produced by Okura Industry Co., Ltd. and the number was converted into a number of dropouts per minute.

(10) Scuff resistance

The base film surface of a magnetic tape slit to a width of ½ inch was brought into contact with a fixed metal pin (6 mm in diameter, 3S finish) plated with hard chromium at a tension of 50 g and a contact angle of 135°, and was caused to run with contact with the pin at a speed of 3 m/sec.

Aluminum was deposited under a vacuum onto the abrased base film surface to a thickness of about 1,000 Å and the degree of scuffing was visually judged in accordance with the following criteria.

| Rank 1: | A great many scuffs |
| Rank 2: | Many scuffs |
| Rank 3: | Intermediate between Ranks 2 and 4 |
| Rank 4: | A few scuffs |
| Rank 5: | No scuff |

(11) Flatness

The thickness of a film was measured at 100 points in total (10 points at 1000 m intervals in the machine direction and 10 points at 10 cm intervals in the transverse direction).

The film thickness was measured by a micrometer produced by Anritsu Denshi Co., Ltd. The total thickness of 10 films placed on top of each other was measured at the corresponding points and the thickness per film was calculated.

The unevenness of the film thickness was represented by the following formula:

$$\frac{X_{max} - X_{min}}{\overline{X}}$$

wherein $X_{max}$ is the maximum measured value, $X_{min}$ is the minimum measured value and $\overline{X}$ is the arithmetical mean value. The smaller the value, the more preferable.

(12) Dirt on calender roll

The degree of dirt on the calender roll surface contacting the base film of the magnetic tape produced by the same manner as in (9) was evaluated by using a 5-stage supercalender. The 5-stage supercalender used consisted of planished metal rolls and polyester type composite resin rolls. Calendering was conducted under the following conditions: roll temperature=85° C., linear pressure=250 kg/cm, tape running speed=80 m/min. A magnetic tape of 5000 m in length was let run 7 times repeatedly, and the amount of white abrasion dust adhering to the resin roll surface was visually observed and the degree of dirt of the roll was evaluated on the following criteria.

| ○: | Substantially no adhesion of white abrasion dust |
| Δ: | Very slight adhesion of white abrasion dust |
| x: | Apparently detectable adhesion of white abrasion dust |

EXAMPLE 1

Into a reactor, were charged 100 parts of dimethyl terephthalate, 60 parts of ethylene glycol and 0.09 part of magnesium acetate tetrahydrate and the content was heated to carry out ester interchange reaction, while raising the temperature and distilling off methanol. The reaction temperature was gradually raised to 230° C. in about 4 hours after the start of the reaction, whereby the ester interchange reaction was substantially completed.

Thereafter, 0.5 part of vaterite calcium carbonate (VAN-030, produced by Maruo Calcium Co., Ltd.) having an average particle size of 0.25 μm and a particle size distribution ratio of 1.29 which had been surface treated with a high-molecular polycarboxylic acid was added as an ethylene glycol slurry. Further, 0.04 part of ethyl acid phosphate and 0.04 part of antimony trioxide were added to the reaction mixture to carry out polycondensation for 4 hours, thereby obtaining polyethylene terephthalate.

The intrinsic viscosity of the polyester was 0.63, and the resistivity of the molten polyester was $1.5 \times 10^7$ $\Omega$-cm. By the observation through a microscope, the polyester was confirmed to contain the particles uniformly dispersed.

By using the polyester obtained, a biaxially oriented polyester film was formed.

The polyester was extruded at 295° C. from an extruder and an amorphous sheet of 200 $\mu$m thick was obtained by an electrostatic cooling method.

The amorphous sheet was then stretched in the machine direction by 3.5 times at 110° C., and then in the transverse direction by 3.5 times at 110° C. After the sheet was heat-treated at 220° C. for 3 seconds, it was cooled to produce a biaxially oriented film having a thickness of 15 $\mu$m.

EXAMPLES 2 TO 5, COMPARATIVE EXAMPLES 1 AND 2

Biaxially oriented films were produced in the same way as in Example 1 except for changing the particles contained in the film and the refractive index of the film, and magnetic tapes were finally produced.

The particle size distribution ratios of the vaterite calcium carbonate used were 1.29 in Examples 2, 3 and 4, and 1.25 in Example 5. The calcite calcium carbonate used in Comparative Example 1 was obtained by synthesis and the particle size distribution ratio thereof was 1.72. The particle size distribution ratios of the kaolin in Comparative Example 2 and the spherical silica in Example 4 were 2.65 and 1.44, respectively.

The aluminum oxide used in Example 3 was obtained by thermal decomposition method and had a delta crystalline form. The deposited particles in Example 5 contained not less than 1 wt % of each of calcium, lithium and phosphorus.

The results of the above Examples and Comparative Examples are collectively shown in Table 1.

the ester interchange reaction was substantially completed.

Thereafter, 0.5 part of vaterite calcium carbonate (VAN-030, produced by Maruo Calcium Co., Ltd.) having an average particle size of 0.25 $\mu$m and a particle size distribution ratio of 1.29 which had been surface treated with a high-molecular polycarboxylic acid was added as an ethylene glycol slurry. Further, 0.04 part of ethyl acid phosphate and 0.04 part of antimony trioxide were added to the reaction mixture to carry out polycondensation for 4 hours, thereby obtaining polyethylene terephthalate.

The intrinsic viscosity of the polyester was 0.63. by the observation through a microscope, the polyester was confirmed to contain the particles uniformly dispersed.

By using the polyester obtained, a biaxially oriented polyester film was formed.

After the polyester was dried, it was extruded at 295° C. from an extruder and an amorphous sheet of 150 $\mu$m thick was obtained by what is called an electrostatic cooling method.

The amorphous sheet was then stretched in the machine direction by 3.8 times at 95° C. and in the transverse direction by 3.6 times at 110° C. and restretched in the machine direction by 1.07 times at 120° C., followed by heat treatment at 220° C. for 3 sec. In this way, a biaxially oriented film of 9.8 $\mu$m which was strengthened in the machine direction was obtained.

The Young's modulus in the machine direction of the film was 680 kg/mm$^2$ and the Young's modulus in the transverse direction was 430 kg/mm$^2$, the difference therebetween being 250 kg/mm$^2$.

EXAMPLES 7 TO 10 AND COMPARATIVE EXAMPLES 3 AND 4

Biaxially oriented films were produced in the same way as in Example 6 except for changing the particles

TABLE 1

| | First Particle | | | Second Particle | | | Film Properties | | | | | | | Magnetic tape characteristics | |
|---|---|---|---|---|---|---|---|---|---|---|---|---|---|---|---|
| | | | | | | | Refractive index | | Surface roughness | | Slip- | Wear | | | |
| | Type | Size ($\mu$m) | Content (%) | Type | Size ($\mu$m) | Content (%) | In thickness direction | Average | Ra ($\mu$m) | Rt/Ra | peri-ness | resis-tance | * | S/N (dB) | Dropout (per min) |
| Example 1 | Vaterite CaCO$_3$ | 0.25 | 0.5 | — | — | — | 1.496 | 1.602 | 0.012 | 8 | 0.24 | A | 3 | +0.4 | 6.2 |
| Example 2 | Vaterite CaCO$_3$ | 0.40 | 0.4 | — | — | — | 1.497 | 1.602 | 0.016 | 9 | 0.20 | A | 3 | +0.1 | 7.1 |
| Comparative Example 1 | Calcite CaCO$_3$ | 0.25 | 0.5 | — | — | — | 1.496 | 1.602 | 0.014 | 16 | 0.25 | A~B | 2 | −1.2 | 13.5 |
| Comparative Example 2 | Kaolin | 0.40 | 0.4 | — | — | — | 1.496 | 1.603 | 0.013 | 19 | 0.30 | B~C | 1 | −1.5 | 16.1 |
| Example 3 | Vaterite CaCO$_3$ | 0.25 | 0.5 | Al$_2$O$_3$ | 0.03 | 0.4 | 1.497 | 1.601 | 0.013 | 8 | 0.23 | A | 5 | +1.0 | 2.8 |
| Example 4 | Vaterite CaCO$_3$ | 0.25 | 0.5 | Spherical silica | 0.20 | 0.2 | 1.496 | 1.602 | 0.015 | 9 | 0.21 | A | 3~4 | +0.5 | 5.8 |
| Example 5 | Vaterite CaCO$_3$ | 0.65 | 0.1 | Deposited silica | 0.40 | 0.2 | 1.496 | 1.602 | 0.016 | 10 | 0.22 | A | 3 | +0.0 | 7.0 |

*Scuff resistance

EXAMPLE 6

Into a reactor, were charged 100 parts of dimethyl terephthalate, 60 parts of ethylene glycol and 0.09 part of magnesium acetate tetrahydrate and the content was heated to carry out ester interchange reaction, while raising the temperature and distilling off methanol. The reaction temperature was gradually raised to 230° C. in about 4 hours after the start of the reaction, whereby contained in the film, and magnetic tapes were finally produced.

The particle size distribution ratios of the vaterite calcium carbonate used were 1.40 in Example 7, and 1.29 in Examples 8, 9 and 10. All of these particles had been surface treated with high-molecular polycarboxylic acid. The calcite calcium carbonate used in Comparative Example 3 was obtained by synthesis and the particle size distribution ratio thereof was 1.72. The particle size distribution ratios of the kaolin in Comparative Example 4 and the spherical silica in Example 9 were 2.65 and 1.44, respectively.

The aluminum oxide used in Example 8 was obtained by thermal decomposition method and had a delta crystalline form. The deposited particles in Example 10 contained not less than 1 wt % of each of calcium, lithium and phosphorus.

EXAMPLE 11

A biaxially oriented film which was strongly oriented in the transverse direction was produced from the polyester composition used in Example 8.

An amorphous sheet obtained in the same way as in Example 6 was stretched in the machine direction by 3.5 times at 90° C., and then in the transverse direction by 4.3 times at 110° C. and restretched in the transverse direction by 1.08 times at 120° C., followed by heat treatment at 220° C. for 3 sec.

The Young's modulus in the machine direction of the film was 440 kg/mm² and Young's modulus in the transverse direction was 670 kg/mm², the difference therebetween being 230 kg/mm².

The results of the above Examples and Comparative Examples are collectively shown in Table 2.

whereby the ester interchange reaction was substantially completed.

Thereafter, 0.5 part of vaterite calcium carbonate (VAN-030, produced by Maruo Calcium Co., Ltd.) having an average particle size of 0.25 μm and a particle size distribution ratio was 1.29 which had been surface treated with a high-molecular polycarboxylic acid was added as an ethylene glycol slurry. Further, 0.03 part of phosphoric acid and 0.04 part of antimony trioxide were added to the reaction mixture to carry out polycondensation for 4 hours, thereby obtaining polyethylene-2,6-naphthalate having an intrinsic viscosity of 0.60.

Thereafter, a polymer having an intrinsic viscosity of 0.68 was produced by the solid phase polymerization of the thus obtained polyethylene-2,6-naphthalate at 0.3 mmHg and 235° C. for 7 hours and extruded at 295° C. from an extruder in the form of a sheet. By an electrostatic cooling method, an amorphous sheet of 110 μm thick was obtained. The amorphous sheet was stretched in the machine direction by 3.9 times at 135° C. by utilizing the peripheral speed difference of rotating rolls and then in the transverse direction by 3.7 time at 140° C. by a tenter. The thus-stretched sheet was heat-treated at 220° C. for 5 seconds to produce a biaxially oriented film having a thickness of 8 μm.

The film obtained was coated with a magnetic layer to produce a magnetic tape.

TABLE 2

| | First Particle | | | Second Particle | | | Film Properties | | | | Magnetic tape characteristics | | |
|---|---|---|---|---|---|---|---|---|---|---|---|---|---|
| | | | | | | | Surface roughness | | Slip- | Wear | | | |
| | Type | Size (μm) | Content (%) | Type | Size (μm) | Content (%) | Ra (μm) | Rt/Ra | peri-ness | resist-ance | Scuff re-sistance | S/N (dB) | Dropout (per min) |
| Example 6 | Vaterite CaCO₃ | 0.25 | 0.5 | — | — | — | 0.011 | 8 | 0.29 | A | 3 | +0.2 | 7.0 |
| Example 7 | " | 0.17 | 0.7 | — | — | — | 0.011 | 8 | 0.30 | A | 3 | +0.4 | 6.2 |
| Comparative Example 3 | Calcite CaCO₃ | 0.25 | 0.5 | — | — | — | 0.012 | 16 | 0.34 | B | 2 | −1.2 | 13.7 |
| Comparative Example 4 | Kaolin | 0.40 | 0.3 | — | — | — | 0.012 | 19 | 0.36 | B~C | 1 | −1.4 | 15.6 |
| Example 8 | Vaterite CaCO₃ | 0.25 | 0.4 | Al₂O₃ | 0.03 | 0.4 | 0.010 | 9 | 0.33 | A | 5 | +0.9 | 2.6 |
| Example 9 | " | 0.25 | 0.4 | Spherical silica | 0.30 | 0.1 | 0.012 | 9 | 0.30 | A | 3~4 | +0.4 | 6.0 |
| Example 10 | " | 0.25 | 0.4 | Deposited silica | 0.40 | 0.2 | 0.013 | 10 | 0.29 | A | 3 | +0.1 | 7.0 |
| Example 11 | " | 0.25 | 0.4 | Al₂O₃ | 0.03 | 0.4 | 0.010 | 8 | 0.32 | A | 5 | +1.0 | 2.4 |

EXAMPLE 12

Into a reactor, were charged 100 parts of dimethyl 2,6-naphthalate, 60 parts of ethylene glycol and 0.09 part of magnesium acetate tetrahydrate and the content was heated to carry out ester interchange reaction, while raising the temperature and distilling off methanol. The reaction temperature was gradually raised to 230° C. in about 4 hours after the start of the reaction,

EXAMPLES 13 AND 14 AN COMPARATIVE EXAMPLES 5 AND 6

Biaxially oriented films and magnetic tapes were produced in the same way as in Example 12 except for changing the particles contained in the film and the film properties.

The results of the above Examples and Comparative Examples are collectively shown in Table 3.

TABLE 3

| | First Particle | | | Second Particle | | | Film Properties | | | | | | | Magnetic tape characteristics | | |
|---|---|---|---|---|---|---|---|---|---|---|---|---|---|---|---|---|
| | | | | | | | Melt resis-tivity | F-5 (kg/mm²) | | Surface roughness | | | Wear resis- | | | Drop-out |
| | Type | Size (μm) | Con-tent (%) | Type | Size (μm) | Con-tent (%) | (Ω-cm) | *1 | *2 | Ra (μm) | Rt/Ra | *3 | tance | *4 | *5 | S/N (dB) | (per min) |
| Example 12 | Vaterite CaCO₃ | 0.25 | 0.5 | — | — | — | 8.5 × 10⁷ | 17.8 | 14.4 | 0.012 | 8 | 0.28 | A | 0.11 | 3 | +0.2 | 6.8 |
| Example 13 | Vaterite CaCO₃ | 0.25 | 0.5 | Spher-ical silica | 0.25 | 0.2 | 8.6 × 10⁷ | 17.7 | 14.3 | 0.015 | 9 | 0.25 | A | 0.11 | 3~4 | +0.0 | 7.1 |
| Example 14 | Vaterite CaCO₃ | 0.25 | 0.5 | Al₂O₃ | 0.03 | 0.3 | 8.7 × 10⁷ | 17.8 | 14.3 | 0.012 | 8 | 0.28 | A | 0.11 | 5 | +1.0 | 2.2 |
| Compar- | Calcite | 0.25 | 0.5 | — | — | — | 8.6 × 10⁷ | 17.7 | 14.3 | 0.013 | 16 | 0.30 | B | 0.11 | 2 | −1.0 | 12.9 |

TABLE 3-continued

| | First Particle | | | Second Particle | | | Film Properties | | | | | | | | | | Magnetic tape characteristics | |
|---|---|---|---|---|---|---|---|---|---|---|---|---|---|---|---|---|---|---|
| | | | | | | | Melt resis- | F-5 (kg/mm²) | | Surface roughness | | | Wear resis- | | | | | Drop-out |
| | Type | Size (μm) | Content (%) | Type | Size (μm) | Content (%) | tivity (Ω-cm) | *1 | *2 | Ra (μm) | Rt/Ra | *3 | tance | *4 | *5 | S/N (dB) | (per min) |
| ative Example 5 | CaCO₃ | | | | | | | | | | | | | | | | |
| Comparative Example 6 | Kaolin | 0.40 | 0.3 | — | — | — | 8.8 × 10⁷ | 17.7 | 14.3 | 0.013 | 19 | 0.34 | B~C | 0.12 | 1 | −1.3 | 15.5 |

*1: Machine direction
*2: Transverse direction
*3: Slipperiness
*4: Thickness unevenness
*5: Scuff resistance

EXAMPLE 15

Into a reactor, were charged 100 parts of dimethyl terephthalate, 60 parts of ethylene glycol and 0.09 part of magnesium acetate tetrahydrate and the content was heated to carry out ester interchange reaction, while raising the temperature and distilling off methanol. The reaction temperature was gradually raised to 230° C. in about 4 hours after the start of the reaction, whereby the ester interchange reaction was substantially completed.

Thereafter, 0.5 part of vaterite calcium carbonate (VAN-030, produced by Maruo Calcium Co., Ltd.) which were approximately elliptic cylindrical particles (the major axial diameter of the base was about 0.30 μm, the minor axial diameter thereof was about 0.25 μm and the cylinder height was about 0.10 μm) having an average particle size of 0.22 μm and a particle size distribution ratio of 1.50 was added as an ethylene glycol slurry. These particles had been surface treated with a high-molecular polycarboxylic acid (3 wt % of the particles) in advance.

After the addition of the slurry, 0.03 part of phosphoric acid and 0.04 part of antimony trioxide were added to the reaction mixture to carry out polycondensation for 4 hours, thereby obtaining polyethylene terephthalate having an intrinsic viscosity of 0.65.

By the observation through a microscope, the polyester was confirmed to contain the particles uniformly dispersed.

By using the polyester obtained, a biaxially oriented polyester film was formed.

The polyester was extruded at 295° C. from an extruder in the form of a sheet and an amorphous sheet of 190 μm thick was obtained by an electrostatic cooling method.

The amorphous sheet was then stretched in the direction of the flow of the sheet (machine direction) by 3.5 times at 110° C., and then in the direction orthogonal to the flow of the sheet (transverse direction) by 3.5 times at 110° C. After the sheet was heat-treated at 220° C. for 3 seconds, it was cooled to produce a biaxially oriented film having a thickness of 15 μm. The Young's modulus in the machine direction of the film was 430 kg/mm², and the Young's modulus in the transverse direction was 440 kg/mm².

COMPARATIVE EXAMPLES 7 AND 8

Polyethylene terephthalate films were produced in the same way as in Example 15 except for using block calcite calcium carbonate particles having an average particle size of 0.22 μm and a particle size distribution ratio of 2.05 which were obtained by synthesis (Comparative Example 7) or flat kaolin having an average particle size of 0.40 μm and a particle size distribution ratio of 2.65 (Comparative Example 8) and changing the content thereof as shown in Table 4, and the properties of the films were evaluated.

EXAMPLE 16

A film was produced in the same way as in Example 15 except for changing the refractive index in the thickness direction of the film to 1.491, and the properties thereof were evaluated.

EXAMPLE 17

A polyethylene terephthalate film was produced in the same way as in Example 15 except for further adding delta aluminum oxide having a primary particle size of 0.02 μm as shown in Table 4, and the properties thereof were evaluated.

EXAMPLE 18

A polyethylene terephthalate film was produced in the same way as in Example 15 except for further adding spherical silica having an average particle size of 0.20 μm and a particle size distribution ratio of 1.44, and the properties thereof were evaluated.

The results of the above Examples and Comparative Examples are collectively shown in Table 4.

EXAMPLE 19

In the process of producing the film in Example 15, after the sheet was stretched in the machine and transverse direction, it was further stretched in the machine direction by 1.08 times.

COMPARATIVE EXAMPLES 9 AND 10

Polyethylene terephthalate films were produced in the same way as in Example 19 except for using the particles used in Comparative examples 7 and 8, respectively, and the properties thereof were evaluated.

EXAMPLES 20 AND 21

In the process of producing the film in Example 15, after the sheet was stretched in the machine and transverse direction, it was further stretched in the transverse direction by 1.09 times at 160° C. The particles added to the film were the same as those in Example 17 for Example 20 and the same as in Example 18 for Example 21.

The results of the above Examples and Comparative Examples are collectively shown in Table 5.

EXAMPLE 22

The same ester interchange reaction as in Example 15 was carried out except for using dimethyl 2,6-naphthalate in place of dimethyl terephthalate.

Thereafter, 0.5 part of the vaterite calcium carbonate used in Example 15 was added as an ethylene glycol slurry. Further, 0.03 part of phosphoric acid and 0.04 part of antimony trioxide were added to the reaction mixture to carry out polycondensation by an ordinary method, thereby obtaining polyethylene-2,6-naphthalate having an intrinsic viscosity of 0.59.

Thereafter, a polymer having an intrinsic viscosity of 0.68 was produced by the solid phase polymerization the obtained polyethylene 2,6-naphthalate at 0.3 mmHg and 235° C. for 7 hours and extruded at 295° C. from an extruder in the form of a sheet. By an electrostatic cooling method, an amorphous sheet of 110 μm thick was obtained. The amorphous sheet was stretched in the machine direction by 4.2 times by utilizing the peripheral speed difference of revolving rolls and then in the transverse direction by 3.9 times by a tenter. The thus stretched sheet was heat-treated at 220° C. for 5 seconds to produce a biaxially oriented film having a thickness of 8 μm.

EXAMPLE 23

A polyethylene-2,6-naphthalate film was obtained in the same way as in Example 22 except for using the elliptic cylindrical vaterite calcium carbonate particles of a similar figure but 1.5 times the size of those used in Example 22 and changing the Young's modulus in the machine direction to 1,000 kg/mm², and the properties thereof were evaluated.

COMPARATIVE EXAMPLES 11 AND 12

Polyethylene-2,6-naphthalate films were produced in the same way as in Example 22 except for using the particles used in Comparative examples 7 and 8 in Comparative Examples 10 and 11, respectively, and the properties thereof were evaluated.

EXAMPLES 24 AND 25

Polyethylene-2,6-naphthalate films were produced in the same way as in Example 22 except for changing the particles used as shown in Table 6, and the properties thereof were evaluated.

The results of the above Examples and Comparative Examples are collectively shown in Table 6.

TABLE 4

|  | First Particle | | | Second Particle | | |
|---|---|---|---|---|---|---|
|  | Type | *(μm) | Content (%) | Type | *(μm) | Content (%) |
| Example 15 | Vaterite CaCO3 | 0.22 | 0.5 | — | — | — |
| Comparative Example 7 | Calcite CaCO3 | 0.25 | 0.5 | — | — | — |
| Comparative Example 8 | Kaolin | 0.40 | 0.4 | — | — | — |
| Example 16 | Vaterite CaCO3 | 0.22 | 0.5 | — | — | — |
| Example 17 | Vaterite CaCO3 | 0.22 | 0.5 | Al2O3 | 0.02 | 0.4 |
| Example 18 | Vaterite CaCO3 | 0.22 | 0.5 | Spherical silica | 0.20 | 0.3 |

*Average particle size

| Film Properties | | | | | | | |
|---|---|---|---|---|---|---|---|
| Surface roughness | | Slip- | Wear resistance | | Magnetic tape characteristics | | |
| Ra (μm) | Rt/Ra | periness | Number of depressions | * | Dirt on calender | S/N (dB) | Scuff resistance |
| na | | | | | | | |
| 1.497 0.011 | 8 | 0.25 | 3 | A | ⊙ | +0.3 | 3 |
| 1.497 0.014 | 18 | 0.26 | 86 | A~B | ⊙~Δ | −1.1 | 2 |
| 1.496 0.013 | 19 | 0.30 | 45 | B~C | Δ~x | −1.5 | 1 |
| 1.491 0.011 | 10 | 0.28 | 11 | A~B | ⊙ | +0.0 | 3 |
| 1.497 0.012 | 8 | 0.23 | 3 | A | ⊙ | +1.0 | 5 |
| 1.497 0.016 | 9 | 0.21 | 5 | A | ⊙ | +0.5 | 3~4 |

*Amount of white abrasion dust

TABLE 5

|  | First Particle | | | Second Particle | | | Film Properties | | | | | | | Magnetic tape characteristics | | |
|---|---|---|---|---|---|---|---|---|---|---|---|---|---|---|---|---|
|  |  |  | Content |  |  | Content | Young's modulus (kg/mm²) | | Surface roughness | | Slip- | Wear resistance | | Dirt on | S/N | Scuff re- |
|  | Type | *(μm) | (%) | Type | *(μm) | (%) | *1 | *2 | Ra (μm) | Rt/Ra | periness | *3 | *4 | calender | (dB) | sistance |
| Example 19 | Vaterite CaCO3 | 0.22 | 0.5 | — | — | — | 700 | 440 | 0.011 | 8 | 0.28 | 5 | A | ⊙ | +0.3 | 3 |
| Comparative Example 9 | Calcite CaCO3 | 0.25 | 0.5 | — | — | — | 690 | 440 | 0.013 | 18 | 0.31 | 95 | B | Δ | −1.3 | 2 |
| Comparative Example 10 | Kaolin | 0.40 | 0.4 | — | — | — | 700 | 430 | 0.012 | 20 | 0.35 | 51 | B~C | Δ~x | −1.6 | 1 |
| Example 20 | Vaterite CaCO3 | 0.22 | 0.5 | Al2O3 | 0.02 | 0.4 | 460 | 690 | 0.011 | 8 | 0.28 | 4 | A | ⊙ | +0.9 | 5 |
| Example 21 | Vaterite CaCO3 | 0.22 | 0.5 | Spherical silica | 0.20 | 0.3 | 460 | 690 | 0.015 | 9 | 0.26 | 6 | A | ⊙ | +0.2 | 3~4 |

*Average particle size
*1: Machine direction
*2: Transverse direction
*3: Number of depressions
*4: Amount of white abrasion dust

TABLE 6

| | First Particle | | | Second Particle | | | Film Properties | | | | | | | Magnetic tape characteristics | | |
|---|---|---|---|---|---|---|---|---|---|---|---|---|---|---|---|---|
| | | | Con- | | | Con- | Young's modulus (kg/mm²) | | Surface roughness | | Slip- | Wear resistance | | | | Scuff re- |
| | | * | tent | | * | tent | | | Ra | Rt/ | peri- | | | Dirt on | S/N | sistance |
| | Type | (μm) | (%) | Type | (μm) | (%) | *1 | *2 | (μm) | Ra | ness | *3 | *4 | calender | (dB) | |
| Example 22 | Vaterite CaCO₃ | 0.22 | 0.5 | — | — | — | 730 | 720 | 0.011 | 8 | 0.28 | 4 | A | ⊚ | +0.4 | 3 |
| Example 23 | Vaterite CaCO₃ | 0.33 | 0.5 | — | — | — | 1000 | 700 | 0.015 | 8 | 0.24 | 6 | A | ⊚ | +0.3 | 3 |
| Comparative Example 11 | Calcite CaCO₃ | 0.25 | 0.5 | — | — | — | 730 | 710 | 0.012 | 19 | 0.31 | 92 | B | Δ | −1.2 | 2 |
| Comparative Example 12 | Kaolin | 0.40 | 0.4 | — | — | — | 730 | 720 | 0.012 | 21 | 0.35 | 60 | B~C | Δ~x | −1.5 | 1 |
| Example 24 | Vaterite CaCO₃ | 0.22 | 0.5 | Al₂O₃ | 0.02 | 0.4 | 730 | 730 | 0.011 | 8 | 0.27 | 4 | A | ⊚ | +1.0 | 5 |
| Example 25 | Vaterite CaCO₃ | 0.22 | 0.5 | Spherical silica | 0.20 | 0.3 | 730 | 720 | 0.014 | 9 | 0.26 | 5 | A | ⊚ | +0.3 | 3~4 |

*Average particle size
*1: Machine direction
*2: Transverse direction
*3: Number of depressions
*4: Amount of white abrasion dust

What is claimed is:

1. A biaxially oriented polyester film comprising: 0.005 to 2.0 wt % of vaterite calcium carbonate particles having an average particle size of 0.07 to 1.5 μm and a particle size distribution ratio defined by the following formula of not more than 2.00:

$$\text{particle size distribution ratio} = \frac{d_{25}}{d_{75}}$$

wherein $d_{25}$ is to particle size (μm) of the vaterite calcium carbonate particle when the cumulative volume thereof is 25% of the total volume of said particles and $d_{75}$ is to particle size (μm) of the vaterite calcium carbonate particle when the cumulative volume thereof is 75% of the total volume of said particles, said cumulative volumes being calculated beginning with the largest particle size.

2. A film according to claim 1, wherein said polyester comprises ethylene terephthalate units as the main constitutional repeating units.

3. A film according to claim 2, wherein the sum of the Young's modulus in the machine direction and the Young's modulus in the transverse direction of said film is not less than 900 kg/mm² and the difference therebetween is not less than 100 kg/mm².

4. A film according to claim 2, wherein the refractive index in the thickness direction of said film is not less than 1.492.

5. A film according to claim 2, wherein the melt resistivity of said polyester is $6 \times 10^6$ to $5 \times 10^8$ Ω-cm.

6. A film according to claim 2, wherein the average refractive index of said film is 1.598 to 1.605.

7. A film according to claim 1, wherein said polyester comprises ethylene 2,6-naphthalate units as the main constitutional repeating units.

8. A film according to claim 7, wherein the sum of the F-5 values in the machine direction and in the transverse direction of said film is not less than 25 kg/mm².

9. A film according to claim 7, wherein the melt resistivity of said polyester is $1 \times 10^7$ to $5 \times 10^8$ Ω-cm.

10. A film according to claim 7, wherein the sum of the Young's modulus in the machine direction and the Young's modulus in the transverse direction of said film is not less than 1,300 kg/mm².

11. A film according to any of claims 1 to 10, wherein the ratio of the major axis and the minor axis of said vaterite calcium carbonate particles is not more than 1.8.

12. A film according to claim 11, further containing aluminum oxide particles.

13. A film according to any of claims 1 to 10, wherein said vaterite carbonate particles is circular cylindrical or elliptic cylindrical.

14. A film according to claim 13, further containing aluminum oxide particles.

* * * * *